W. CHOLEWINSKI.
TRAP.
APPLICATION FILED SEPT. 22, 1911.

1,027,181.

Patented May 21, 1912.

2 SHEETS—SHEET 1.

Fig. 1.

WITNESSES

INVENTOR
W. Cholewinski.
BY

ATTORNEYS

W. CHOLEWINSKI.
TRAP.
APPLICATION FILED SEPT. 22, 1911.
1,027,181.
Patented May 21, 1912.
2 SHEETS—SHEET 2.
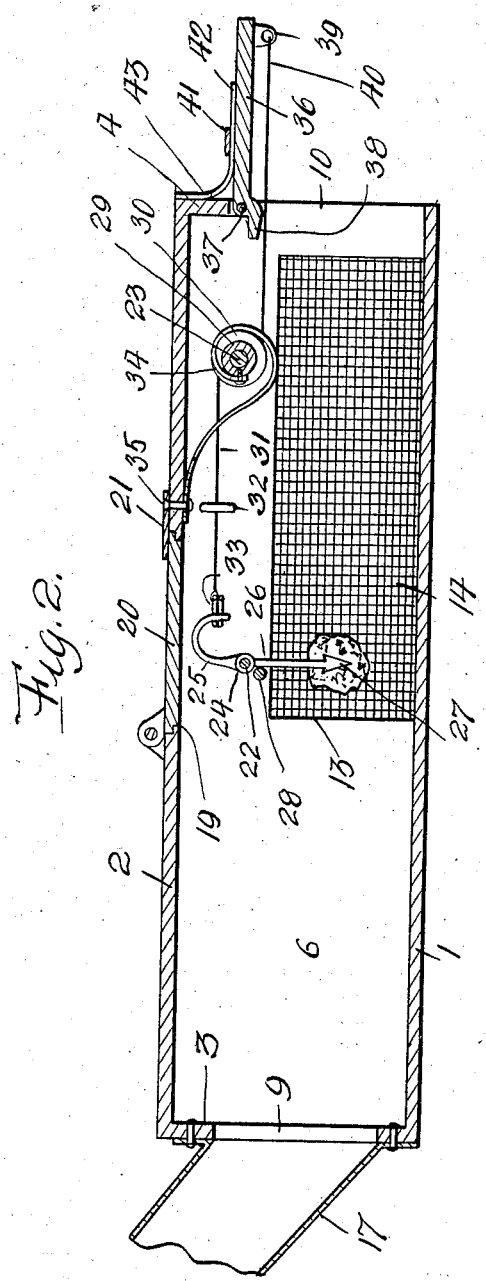
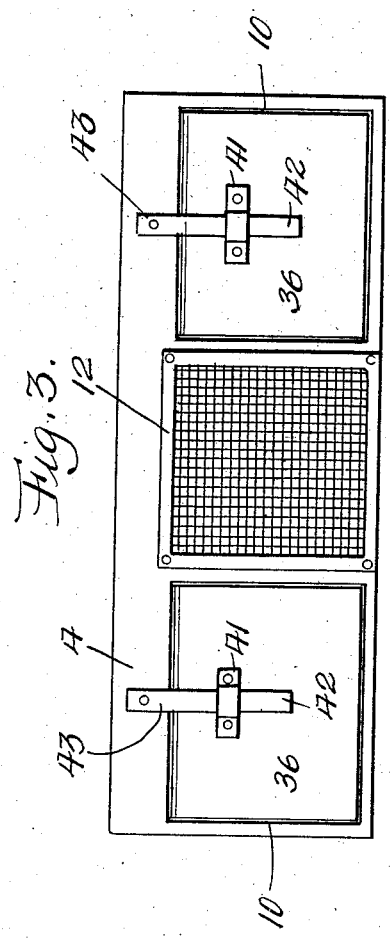
WITNESSES
INVENTOR
W. Cholewinski.
BY
ATTORNEYS

UNITED STATES PATENT OFFICE.

WALENTY CHOLEWINSKI, OF OSHKOSH, WISCONSIN.

TRAP.

1,027,181.  Specification of Letters Patent.  Patented May 21, 1912.

Application filed September 22, 1911. Serial No. 650,711.

*To all whom it may concern:*

Be it known that I, WALENTY CHOLEWINSKI, a subject of the Emperor of Germany, residing at Oshkosh, in the county of Winnebago and State of Wisconsin, have invented certain new and useful Improvements in Traps, of which the following is a specification, reference being had therein to the accompanying drawing.

This invention relates to traps especially designed for entrapping rodents.

The primary object of my invention is to provide a box like trap with doors that are maintained in an open position by bait holders, said doors being released when the bait holders are moved by a rodent.

Another object of this invention is the provision of means for drowning or exterminating the lives of rodents entrapped, the drowning of the rodents occurring at a point removed from the trap, whereby the trap can be immediately set to entrap another rodent.

A further object of this invention is to provide a strong and durable trap that can be advantageously used in buildings infested with rodents, the trap being constructed whereby it can be safely handled, cleansed and maintained in a sanitary condition.

With the above and other objects in view, the invention resides in the novel construction, combination and arrangement of parts to be hereinafter specifically described and then claimed.

Reference will now be had to the drawings, wherein like numerals of reference designate corresponding parts throughout the several views, in which:—

Figure 1 is a plan of the trap partly broken away and partly in section, Fig. 2 is a longitudinal sectional view of the trap, and Fig. 3 is an end view of the same.

A trap in accordance with this invention comprises a bottom plate 1, a top plate 2, a rear wall 3, a front wall 4, converging side walls 5 and converging partitions 6, the converging walls 5 and the partition 6 providing passages 7 and a blind compartment 8. The walls 5 and the partitions 6 converge from the front wall 4 to the rear wall 3 and the compartment 8 is intermediate the passages 7 with said passages in communication with openings 9 in the rear wall 3 and doorways 10 in the front wall 4. The front wall 4 has a central opening 11 covered by a screen 12 secured to the outer side of the wall 4. The partitions 6 have oblong openings 13 covered by screens 14, and it is through the medium of the screens 12 and 14 that a rodent can observe baits within the passages 7. These openings and partitions also allow the odor of the bait to escape from the trap to attract a rodent to the same. The side walls 5 are provided with openings 15 having transparent plates 16, these openings admitting light to the passages 7. The openings 9 of the rear wall 3 are in communication with a conduit or pipe 17 extending from the wall 3 to a suitable tank or receptacle 18 adapted to contain water. The conduit or pipe 17 communicates with the receptacle 18 above the bottom thereof and extends toward said receptacle 18 upwardly at an inclination. The tank or receptacle 18 is located some distance from the trap and to encourage a rodent to enter the pipe 17, the lower end of said pipe is flared, this flared end also permitting of both of the passages 7 communicating with the pipe. The top plate 2 of the trap has doorways 19 for hinged doors 20, said doors being locked in a closed position by pivoted buttons 21. It is through the medium of the doorways 19 that easy access is had to the passages 7 for baiting the trap.

Arranged transversely of the trap, intermediate the ends thereof, is a shaft 22 and arranged transversely of the trap, adjacent to the front wall 4, is a shaft 23. Loosely mounted upon the shaft 22, within the passages 7, are rock sleeves 24 having vertical hooks 25 and depending bait holders 26 for bait 27. The rock sleeves are limited in their movement in one direction by rods 28 arranged transversely of the passages 7.

Revolubly mounted upon the shaft 23, within the passages 7, are sleeves 29 having the ends thereof provided with spirally grooved spools 30. Attached to the spools 30 are the ends of cables 31 adapted to wind thereon, said cables extending through eyes 32 carried by the confronting sides of the walls 5 and the partition 6. The ends of the cable 31 are provided with rings 33 adapted to engage the hook 25, carried by the rock sleeves 24. Attached to the sleeve 29, intermediate the ends thereof, is the end of a spiral spring 34, said spring having the opposite end thereof attached to the top plate 2 by the same rivet or pin 35 that pivotally holds the button 21.

The doorways 10 are provided with doors 36 having the upper ends thereof pivotally mounted in the doorways 10 by pivot pins 37. The upper inner edges of the doors 36 are provided with stops 38 to limit the closing movement of said doors, and the lower inner edges of the doors have apertured lugs 39. Connected to these lugs are cables 40 having the opposite ends thereof connected to the spools 30. The outer sides of the doors 36 are provided with straps 41 and movably held by these straps are the free ends 42 of flat springs 43, carried by the front wall 4. With the rings 33 upon the hooks 25, the cables 31 and 40 are unwound upon the spools 30 and the springs 34 and 43 are under tension, the spring 34 having a tendency to revolve the sleeve 29 and wind the cables 31 and 40 upon the spools, while the springs 43 hold the doors 36 open.

When a rodent enters one of the longitudinal passages 7 and pulls upon the bait 27 to remove it from the holders 26, the sleeve 24, in the passage entered by the rodent, is rocked, moving the hook 25 out of engagement with the rings 33, thereby releasing the cables 31 and allowing the spring 34 to wind the cables upon the spools 30. The spring 34 is of sufficient strength to wind the cables 44 upon the spools, to close the door 36 against the action of the spring 43. The rodent is then entrapped and in trying to escape enters the pipe 17 and is precipitated into the water contained within the tank 18. Since the sleeves 24 are loosely mounted upon the shaft 22 and the sleeves 29 loosely mounted upon the shaft 23, the door releasing mechanism within one passage can be operated independently of the mechanism within the other passage. The door releasing mechanism is easily reset within one of the passages by opening the door 20 thereof.

From the foregoing it will be observed that I have devised a box like trap having converging passages leading to an exterminating tank, and that the independent door releasing mechanisms are positive in their operation for entrapping a rodent before escape is possible.

What I claim is:—

1. A trap comprising a box having converging passages formed therein, an exterminating tank in communication with the rear ends of said passages, spring pressed hinged doors arranged in the forward ends of said passages, means arranged in each passage and including a bait holder, spring actuated spools, and cables for closing the door to the passage when said bait holder is moved.

2. A trap comprising a box having converging longitudinal passages, spring pressed doors arranged at the forward ends of said passages, movable bait holders arranged in said passages, spools arranged in said passages, cables connecting said spools and said doors, cables connecting said spools and said bait holders, and means in connection with said spools and adapted to wind the first mentioned cables thereon when the last mentioned cables are released by said bait holders.

3. A trap comprising a box having longitudinal passages and a blind chamber between said passages, an exterminating tank in communication with the rear ends of said passages, spring pressed doors arranged in the forward ends of said passages, movable bait holders arranged in said passages, spring actuated spools arranged in said passages, cables connecting said spools and said doors, cables connecting to said spools and loosely connected to said bait holders, and means in said passages for limiting the movement of said bait holders in one direction.

In testimony whereof I affix my signature in the presence of two witnesses.

WALENTY CHOLEWINSKI.

Witnesses:
 A. H. GRUENEWALD,
 ART FROHEIB.

Copies of this patent may be obtained for five cents each, by addressing the "Commissioner of Patents, Washington, D. C."